US010056973B2

(12) United States Patent
Syed et al.

(10) Patent No.: US 10,056,973 B2
(45) Date of Patent: Aug. 21, 2018

(54) MULTI LAYER NETWORK RESILIENCY WITH SOFTWARE DEFINED ORCHESTRATION

(71) Applicant: Infinera Corp., Annapolis Junction, MD (US)

(72) Inventors: Sharfuddin Syed, San Jose, CA (US); Abhinava Shivakumar Sadasivarao, Milpitas, CA (US); Chris Liou, Cupertino, CA (US); Michael Frendo, Pleasanton, CA (US); Biao Lu, Saratoga, CA (US); Steven Joseph Hand, San Jose, CA (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 14/145,575

(22) Filed: Dec. 31, 2013

(65) Prior Publication Data
US 2015/0188624 A1    Jul. 2, 2015

(51) Int. Cl.
| | |
|---|---|
| H04J 14/02 | (2006.01) |
| H04B 10/032 | (2013.01) |
| H04L 12/24 | (2006.01) |
| H04Q 11/00 | (2006.01) |
| H04L 12/707 | (2013.01) |
| H04L 12/715 | (2013.01) |
| H04L 12/703 | (2013.01) |

(52) U.S. Cl.
CPC ........ *H04B 10/032* (2013.01); *H04J 14/0287* (2013.01); *H04L 41/0668* (2013.01); *H04L 45/22* (2013.01); *H04L 45/28* (2013.01); *H04L 45/64* (2013.01); *H04Q 11/0066* (2013.01); *H04Q 2011/0081* (2013.01)

(58) Field of Classification Search
CPC .......................... H04J 14/0217; H04J 14/0268
See application file for complete search history.

(56) References Cited

U.S. PATENT DOCUMENTS

| | | | |
|---|---|---|---|
| 2006/0120718 A1* | 6/2006 | Natori ................ | H04B 10/032 398/19 |
| 2006/0210268 A1* | 9/2006 | Gumaste ............. | H04J 14/0227 398/31 |
| 2012/0321296 A1* | 12/2012 | Wellbrock ........... | H04B 10/038 398/5 |

(Continued)

*Primary Examiner* — Nathan Cors
(74) *Attorney, Agent, or Firm* — David L. Soltz

(57) ABSTRACT

Methods and systems are disclosed for storing, in a non-transitory memory device, multi-layer network information comprising at least one of link availability, bandwidth availability, priority levels for paths in a multi-layer network, path status in the multi-layer network, and status for network elements in the multi-layer network; receiving, via at least one input component, a message from a network element in the network comprising information indicative of a failure of a working path in the network; determining, automatically, based at least in part on the multi-layer network information, an alternate path for transmission of the data traffic through the network; and transmitting, via at least one output component, at least one signal comprising configuration instructions to at least one optical line module, the configuration instructions directing the optical line module to switch and select the data traffic using the alternate path.

9 Claims, 11 Drawing Sheets

(56) References Cited

U.S. PATENT DOCUMENTS

2013/0209091 A1\* 8/2013 Mateosky ........ H04B 10/07953
    398/26
2014/0126906 A1\* 5/2014 Bernstein ............ H04J 14/0227
    398/48

\* cited by examiner

MULTI LAYER NETWORK RESILIENCY WITH SOFTWARE DEFINED ORCHESTRATION

FIELD OF THE DISCLOSURE

The disclosure generally relates to methods and apparatuses for orchestration of configuration, protection and restoration in multiple layers in data transport networks. In one implementation, the disclosure relates to methodologies and systems for orchestration of configuration, protection and restoration in data transport networks.

BACKGROUND

Information transport networks are well known in the art and function to transmit information such as computer data between various computer systems operably coupled to the information network. Client networks may be sending to and receiving information from the information transport networks, for example, through one or more routers. Generally, data transport networks are defined as having multiple "layers" that combine to make a network. For example, one standard that describes a multi-layer model is the International Telecommunication Union recommendation ITU-T X.200 (07/94), entitled "Information technology—Open Systems Interconnection—Basic Reference Model: The basic model." The Open Systems Interconnection (OSI) Model contains the following seven layers: the Application Layer (layer 7), the Presentation Layer (layer 6), the Session Layer (layer 5), the Transport Layer (layer 4), the Network Layer (layer 3), the Data Link Layer (layer 2), and the Physical Layer (layer 1). The model may also include a Layer Zero containing transmission media. Layers may be generally referred to as electronic layers (also known as digital layers) and optical layers.

The electronic/digital layer and the optical layer each contain multiple sub-layers. The optical layer provides optical connections, also referred to as optical channels or lightpaths, to other layers, such as the electronic layer. The optical layer performs multiple functions, such as monitoring network performance, multiplexing wavelengths, and switching and routing wavelengths. Additional structure, architecture, and modeling are further described in the International Telecommunication Union recommendations, including ITU-T G.709, ITU-T G.872, and ITU-T G.805, which are well known in the art.

Typically, packet switched network systems are interconnected using wavelengths from the optical transmission backbone (the transport layer) that may contain a mix of wave-division multiplexing (WDM) (optical) transmission and/or Optical Transport Network (OTN) (Digital) switching technologies and/or packet switching technologies. Conventionally, traffic engineers may set or pre-engineer a path for a data traffic flow through the packet switched layer of the network, or the path may be computed using native routing protocols within the packet switched layer.

A switched network usually includes multiple switch nodes (also referred to as "nodes") which are connected by communication links and arranged in a topology referred to in the art as a "mesh network". Within the mesh network, user traffic can be transported between any two locations using predefined connections specifying particular links and/or switch nodes for conveying the user traffic. Shared Mesh Protection (SMP) is a common protection and recovery mechanism in mesh networks, where multiple paths can share the same set of network resources (such as bandwidth or timeslots) for protection purposes. Mesh networks utilizing Shared Mesh Protection may be referred to as shared mesh networks.

The switch nodes in the mesh network are each provided with a control module. The control modules of the switch nodes function together to aid in the control and management of the mesh networks. The control modules can run a variety of protocols for conducting the control and management of the mesh networks. One prominent protocol is referred to in the art as "Generalized Multiprotocol Label Switching (GMPLS)".

Generalized Multiprotocol Label Switching (GMPLS) is a type of protocol which extends multiprotocol label switching to encompass network schemes based upon time-division multiplexing (e.g. SONET/SDH, PDH, G.709), wavelength multiplexing, and spatial switching (e.g. incoming port or fiber to outgoing port or fiber). Multiplexing, such as time-division multiplexing is when two or more signals or bit streams are transferred over a common channel. Wave-division multiplexing (WDM) is a type of multiplexing in which two or more optical carrier signals are multiplexed onto a single optical fiber by using different wavelengths (that is, colors) of laser light.

Generalized Multiprotocol Label Switching includes multiple types of label switched paths including protection and recovery mechanisms which specifies predefined (1) working connections within a mesh network having multiple nodes and communication links for transmitting data between a headend node and a tailend node; and (2) protecting connections specifying a different group of nodes and/or communication links for transmitting data between the headend node to the tailend node in the event that one or more of the working connections fail. Working connections may also be referred to as working paths. Protecting connections may also be referred to as recovery paths and/or protecting paths and/or protection paths. A first node of a path may be referred to as a headend node or a source node. A last node of a path may be referred to as a tailend node or end node or destination node. Typically, the headend node or tailend node initially selects to receive data over the working connection (such as an optical channel data unit label switched path) and then, when a working connection fails, the headend node or tailend node selects a protecting connection for passing data within the mesh network. The set up and activation of the protecting connections may be referred to as restoration or protection. Protection mechanisms, where network resources act as backup for working connections, have been in use for some time.

Routing and topology management protocols may also be used with GMPLS. For example, under OSPF protocols, typically each node in a network maintains a database of the network topology and the current set of resources available, as well as the resources used to support traffic. In the event of any changes in the network, or simply periodically, the node floods the updated topology information to all the network nodes. The nodes use the database information to chart routes through the network.

In current systems, to set up a connection in an information transport network, nodes in the network exchange messages with other nodes in the network (for example, by using RSVP or RSVP-TE signaling protocols). Resources required for the connection are reserved and switches inside a node of the network are pre-configured to forward information from certain input ports to certain output ports. Information sent by signaling protocols are often in a type-length-value (TLV) format. The same protocols may also be used to take down connections in the network when the connections are no longer needed.

Current systems typically control configuration, protection and recovery mechanisms at the digital level in the network. Particularly, protection resources are typically controlled by the nodes and may be dedicated to act as backup paths (protection paths) in the event of a failure in the network resources carrying data traffic through the working paths. For example, in Shared Mesh Protection (SMP) the headend node or tailend node initially sets up one or multiple protection paths for a particular working path. During setup, network resources, for example, nodes, communication links, and timeslots, are specified for each path. Each protection path may reserve the timeslots on the intermediate nodes of the protection path, but does not actually configure them until needed. The timeslots may be shared by multiple protection paths.

The implementation of recovery in the network after a failure generally includes the source and/or destination nodes in the path digitally switching to the reserved nodes and communication links outside of the original working path to reroute data traffic through the network. The nodes may have limited knowledge of the bandwidth resources available in the network. Additionally, it may be inefficient to dedicate and reserve backup nodes and to switch to those backup nodes.

As information transport systems move to integrated optical and digital network models, systems and methods are needed to orchestrate network resources and to configure and control network elements across multi-layers in the network, for example, for protection and restoration services.

SUMMARY

The problem of inadequate mechanisms for addressing protection and recovery mechanisms in integrated networks is addressed through methods and systems utilizing orchestration of network resources and optical switching.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
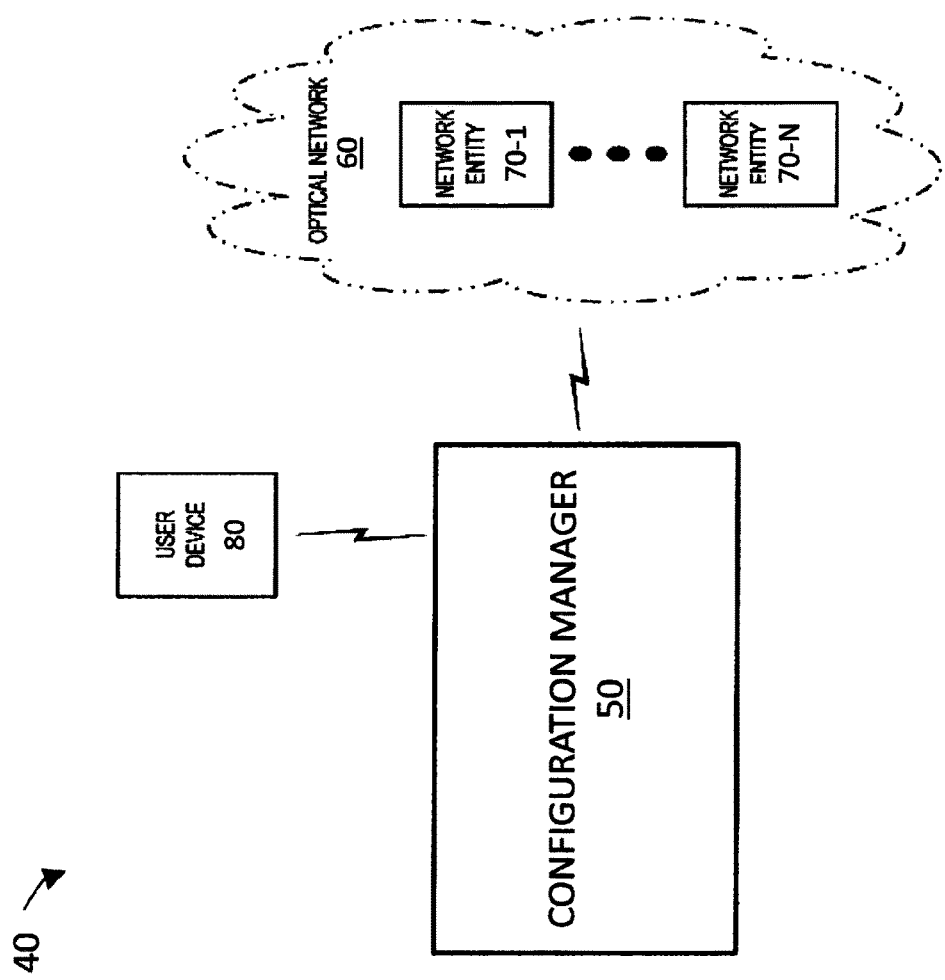
FIG. 1 is a diagram of an example environment in which systems and/or methods described herein may be implemented.

The following detailed description refers to the accompanying drawings. The same reference numbers in different drawings may identify the same or similar elements.

The mechanisms proposed in this disclosure circumvent the problems described above. The mechanisms proposed in this disclosure provide additional flexibility in the management, configuration, discovery, monitoring and provisioning of the transport network. The present disclosure describes methods and systems which enhance the management and provisioning of transport networks which may conform to the GMPLS protocols, for example. In some embodiments, the transport network is provided with a plurality of nodes with at least some of the nodes having a control module having a first processor accessing a first database storing first network node configuration information and being configured to compute a first path to a destination node within the transport network through the output interface with the first network node configuration information. Once the first path is computed, then the first processor sends first signals, which can conform to RSVP or RSVP-TE signaling protocols to other nodes on the first path so that the other nodes will be configured to be a part of the first path. The first processor can be a component of a headend node of the first path.

The system is also provided with a configuration manager that may be separate from the plurality of nodes. The configuration manager may have a second processor accessing a second database storing second network node configuration information and being configured to compute a second path from a headend node (that does not include the second processor) to a tailend node of the plurality of nodes, updating the second network configuration information with information indicative of the second path, and sending second signals to at least the headend node and the tailend node to set up and enable the second path. The second signals may conform to the protocol of the first signals, or may utilize a different protocol such as a protocol referred to in the art as "OpenFlow."

Utilizing first and second processors with the first processor being a part of the headend node of the paths computed by the first processor within the transport network, and the second processor being separate from the headend node of at least some of the paths computed by the second processor within the transport network provides additional flexibility in the management, configuration, discovery, monitoring and provisioning of the transport network as will be discussed below.

The first processor may execute "implicit provisioning" in which a configuration manager instructs the headend node to compute the path. In this case, the creation of required cross-connects may be handled by the GMPLS control plane running on the network elements.

The second processor may execute "explicit provisioning" in which the configuration manager computes the path and also instructs network elements to create any required cross-connects. In this scenario, the GMPLS control plane running on the network elements is not required for path computation purposes.

The present disclosure describes in one embodiment methods and systems for storing, in a non-transitory memory device, multi-layer network information comprising at least one of link availability, bandwidth availability, priority levels for paths in a multi-layer network, path status in the multi-layer network, and status for network elements in the multi-layer network; receiving, via at least one input component, at least one message from a network element in the multi-layer network comprising information indicative of at least one failure of at least one working path in the network, wherein the working path carries data traffic through the network when there is no failure; determining, automatically, based at least in part on the multi-layer network information, an alternate path for transmission of the data traffic through the multi-layer network; and transmitting, via at least one output component, at least one signal comprising configuration instructions to at least one optical line module, the configuration instructions directing the optical line module to switch and select the data traffic using the alternate path.

In one embodiment, the methods and systems may also determine, automatically, based at least in part on the multi-layer network information, which of the failed working paths has higher priority; and transmit, via the at least one output component, at least one signal comprising configuration instructions to at least one network element having integrated digital and optical components, the configuration instructions directing the optical component to switch the data traffic from the higher priority working path to the alternate path.

In one embodiment, a method may comprise transmitting, with circuitry of a first node in a network, to a configuration management device, a signal comprising information indicative of at least one failure to transmit optical data in at least one working path through a network; receiving, by at least one optical line module in the first node, from the configuration management device, a signal comprising instructions for switching at least one optical data transmission from the at least one working path to an alternate path using the at least one optical line module in the first node; and switching, with the at least one optical line module in the first node, the optical data transmission to the alternate path.

In one embodiment, the at least one optical line module may comprise at least one ROADM based optical line module.

In one embodiment, the at least one optical line module may provide Colorless, Directionless, and Contentionless functionality.

Definitions

If used throughout the description and the drawings, the following short terms have the following meanings unless otherwise stated:

API stands for Application Program Interface.

APS stands for Automatic Protection Switching.

CDC stands for Colorless, Directionless, and Contentionless. CDC functionality of circuitry of a network element allows for the flexible set up and/or modification of wavelength paths through a network.

GMPLS stands for Generalized Multi-Protocol Label Switching which extends Multi-Protocol Label Switching to encompass time-division (for example, SONET/SDH, PDH, G.709), wavelength (lambdas), and spatial multiplexing (e.g., incoming port or fiber to outgoing port or fiber). The GMPLS framework includes a set of routing protocols which runs on a control module. The Generalized Multiprotocol Label Switching architecture is defined, for example in RFC 3945.

IETF stands for Internet Engineering Task Force. The Internet Engineering Task Force (IETF) is a volunteer group dedicated to improving the Internet by proposing uniform standards for data transfer protocols, among other things. The IETF has recently extended GMPLS to allow for the transmission of more data through an Optical Transport Network (OTN). The IETF publishes Requests for Comment (RFC) detailing proposed standard protocols.

IP stands for Internet Protocol which is a protocol used for communicating data across a packet-switched internetwork using the Internet Protocol Suite, also referred to as TCP/IP.

LSP stands for Label Switched Path which is a path through a Generalized Multi-Protocol Label Switching network. Note that Label Switched Paths can be bidirectional or unidirectional; they enable packets to be label switched through the Multiprotocol Label Switched network from a port on an ingress node (which can be called a headend node) to a port on an egress node (which can be called a tailend node).

MPLS stands for multi-protocol label switching which is a scheme in telecommunications networks for carrying data from one node to the next node. MPLS operates at an OSI model layer that is generally considered to lie between traditional definitions of layer 2 (data link layer) and layer 3 (network layer) and is thus often referred to as a layer 2.5 protocol.

OAM stands for Operation, Administration and Maintenance, and generally refers to the control and management of a network.

OTN stands for Optical Transport Network which includes a set of optical switch nodes which are connected by optical fiber links. ITU-T recommendations G.709 and G.872 define OTN interface requirements and network architecture respectively.

ROADM stands for reconfigurable optical add/drop multiplexer. Network operators can remotely reconfigure the multiplexer by sending soft commands with a ROADM. A ROADM may receive an optical signal containing information, for example, information regarding the Operation, Administration, and/or Maintenance (OAM) of optical layers in the transport network. The ROADM may extract the information from the signal. The ROADM may also insert information, such as OAM information, into an outgoing signal.

SDN stands for Software Defined Networking. SDN, as used herein, includes software, which may be executed by hardware that is separate from switch nodes within the optical transport network, and which includes the functionality to compute and provision paths through the optical transport network for multiple switch nodes as well as instruct one or more switch nodes to compute paths through the optical transport network.

TE stands for Traffic Engineering which is a technology that is concerned with performance optimization of operational networks. In general, TE includes a set of applications mechanisms, tools, and scientific principles that allow for measuring, modeling, characterizing and control of user data traffic in order to achieve specific performance objectives.

Network Priority refers to Setup & Holding priority as defined in RFC 3209, "RSVP-TE: Extensions to RSVP for LSP Tunnels", December 2001. In general, network priorities are assigned to connections in a shared mesh network and utilized to indicate which connections take precedent over other connections.

Description

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

Also, certain portions of the implementations have been described as "components" or "circuitry" that perform one or more functions. The term "component" or "circuitry" may include hardware, such as a processor, an application specific integrated circuit (ASIC), or a field programmable gate array (FPGA), or a combination of hardware and software. Software includes one or more computer executable instructions that when executed by one or more component cause the component or circuitry to perform a specified function. It should be understood that the algorithms described herein are stored on one or more non-transient memory. Exemplary non-transient memory includes random access memory, read only memory, flash memory or the like. Such non-transient memory can be electrically based or optically based. Further, the messages described herein may be generated by the components and result in various physical transformations.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Referring now to the drawings, FIG. 1 is a diagram of an example environment 40 in which systems and/or methods described herein may be implemented. Environment 40 may include an integrated multi-Layer, multi-vendor, Configuration Manager 50 and an optical network 60 that includes one or more network entities 70-1 through 70-N (N≥1) also referred to as network elements (hereinafter referred to individually as "NE 70" and collectively as "NEs 70").

The number of devices and/or networks illustrated herein is provided for explanatory purposes. In practice, there may be additional devices and/or networks, fewer devices and/or networks, different devices and/or networks, or differently arranged devices and/or networks than are shown in FIG. 1. Furthermore, two or more of the devices illustrated in FIG. 1 may be implemented within a single device, or a single device illustrated in FIG. 1 may be implemented as multiple, distributed devices. Additionally, or alternatively, one or more of the devices of environment 40 may perform one or more functions described as being performed by another one or more of the devices of environment 40. Devices of environment 40 may interconnect via wired connections, wireless connections, or a combination of wired and wireless connections.

Configuration Manager 50 may include one or more devices that gather, process, search, store, and/or provide information in a manner described herein. Configuration Manager 50 may also be referred to as an orchestration console or network controller. Configuration Manager 50 may receive and/or store network information regarding a multi-layer network, such as network 60. For example, Configuration Manager 50 may receive and/or store information regarding network configuration, which may include a quantity, location, capacity, status, and/or configuration of NEs 70; failure information, communication priority, characteristics and/or configurations (e.g., capacity) of paths and/or super-channels between NEs 70; traffic demands of NEs 70 and/or super-channels between NEs 70; and/or any other network configuration information associated with the network 60 (e.g., optical device configurations, digital device configurations, etc.).

Network topology information may be determined by using standard topology discovery procedures. NEs 70 may provide network information to Configuration Manager 50, for example, through messages to Configuration Manager 50.

Configuration Manager 50 may control one or more of the NEs 70. Configuration Manager 50 may use any Application Program Interface (API) to control the NEs 70, non-exclusive examples of which include NETCONF, REST, OpenFlow, TL1, etc., to provide network management tasks such as FCAPS functionality (Fault, Configuration, Accounting, Performance, and Security functionality). For example, Configuration Manager 50 may utilize a particular API to configure/reconfigure NEs 70 and to support protection/recovery mechanisms in the network 60. Configuration Manager 50 may provide information associated with network configuration changes to the network 60 and/or NEs 70 in order to allocate network bandwidth and/or super-channels based on the network information, such as link failures and path priorities. Configuration Manager 50 may utilize GMPLS based restoration functions and/or may utilize manually provisioned services.

Figure 2:
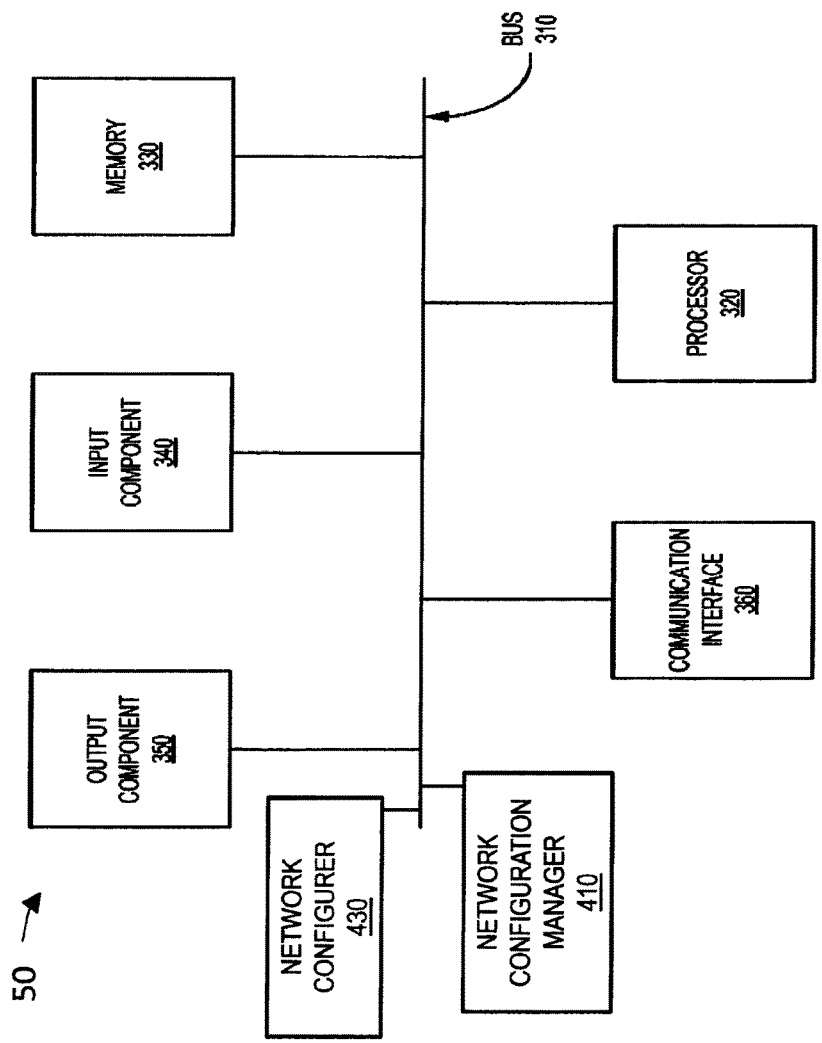
FIG. 2 is a schematic diagram of an exemplary configuration manager in accordance with the present disclosure.

FIG. 2 is a diagram of example components of the Configuration Manager 50. Of course, the Configuration Manager 50 components may be split into multiple devices, such as multiple NEs 70, or other devices in and/or outside of the network 60.

Configuration Manager 50 may include a bus 310, a processor 320, a memory 330, an input component 340, an output component 350, and a communication interface 360. In some implementations, Configuration Manager 50 may include additional components, fewer components, different components, or differently arranged components than those illustrated in FIG. 2.

Bus 310 may include a path that permits communication among the components of Configuration Manager 50. Processor 320 may include one or more processor, such as one or more microprocessor, and/or any processing logic (e.g., a field-programmable gate array ("FPGA"), an application-specific integrated circuit ("ASIC"), etc.) that may interpret and execute instructions. Memory 330 may include a random access memory ("RAM"), a read only memory ("ROM"), and/or any type of dynamic or static storage device (e.g., a flash, magnetic, or optical memory) that may store information and/or instructions for use by processor 320.

Input component 340 may include any mechanism that permits a user to input information to Configuration Manager 50 (e.g., a keyboard, a keypad, a mouse, a button, a switch, etc.). Output component 350 may include any mechanism that outputs information (e.g., a display, a speaker, one or more light-emitting diodes ("LEDs"), etc.). Communication interface 360 may include any transceiver-like mechanism, such as a transceiver and/or a separate receiver and transmitter, that enables device Configuration Manager 50 to communicate with other devices and/or systems, such as via a wired connection, a wireless connection, or a combination of wired and wireless connections. For example, communication interface 360 may include mechanisms for communicating with another device and/or system via a network, such as optical network 60. Additionally, or alternatively, communication interface 360 may be a logical component that includes input and output ports, input and output systems, and/or other input and output components that facilitate the transmission of data to and/or from other devices, such as an Ethernet interface, an optical interface, a coaxial interface, an infrared interface, a radio frequency ("RF") interface, a universal serial bus ("USB") interface, or the like.

Configuration Manager 50 may perform various operations described herein. Configuration Manager 50 may perform these operations in response to processor 320 executing software instructions contained in a computer-readable medium, such as memory 330. A computer-readable medium may be defined as a non-transitory memory device. A memory device may include space within a single storage device or space spread across multiple storage devices.

Software instructions may be read into memory 330 from another computer-readable medium or from another device via communication interface 360. Software instructions stored in memory 330 may cause processor 320 to perform processes that are described herein. Additionally, or alternatively, hardwired circuitry may be used in place of or in combination with software instructions to implement processes described herein. Thus, implementations described herein are not limited to any specific combination of hardware circuitry and software.

Configuration Manager 50 may include a network configuration manager 410 and a network configurer 430. Each of functional components 410-430 may be implemented using one or more components of Configuration Manager 50. The functional components of Configuration Manager 50 may be distributed singularly or duplicatively in any manner between NEs and/or devices external to the network 60. In some implementations, Configuration Manager 50 may include other functional components (not shown) that aid in managing network configurations and allocating network resources. Network configuration manager 410 ("NCM 410") may perform operations associated with managing a network configuration. In some implementations, NCM 410 may receive network configuration information from NEs 70.

The initial network configuration information provided to NCM 410 may be supplemented with network configuration information received from NEs 70. For example, NEs 70 may provide real-time network deployment information to update the initial network configuration information. For example, NCM 410 may receive network configuration information from NEs 70 that identifies newly-deployed NEs 70 and/or new super-channels between NEs 70. Additionally, or alternatively, NCM 410 may receive other network configuration information from NEs 70, such as super-channel allocation information that identifies super-channels that are available for optical transmission, assigned to transmit optical signals, currently being used to transmit optical signals, and/or blocked from transmitting optical signals.

Network configurer 430 may perform operations associated with configuring an optical network and/or network entities associated with an optical network. For example, network configurer 430 may aid in configuring network 60 and/or NEs 70. Network configurer 430 may receive information associated with network configuration changes. Network configurer 430 may communicate the information associated with the changes to NEs 70 (and/or other devices in optical network 60) so that NEs 70 may adjust their configuration in accordance with the network configuration changes. For example, network configurer 430 may provide instructions to NEs 70 that indicate that NEs 70 are to reserve capacity (e.g., bandwidth) over one or more super-channels connecting NEs 70. In some implementations, network configurer 430 may receive information validating a changed configuration from NEs 70, and may provide the configuration validation information to user device 80.

Returning now to FIG. 1, NEs 70 may include one or more devices that gather, process, store, and/or provide information in a manner described herein. For example, NEs 70 may include one or more optical data processing and/or traffic transfer devices, such as an optical node, an optical add-drop multiplexer ("OADM"), a reconfigurable optical add-drop multiplexer ("ROADM"), an optical multiplexer, an optical demultiplexer, an optical transmitter, and optical receiver, an optical transceiver, a photonic integrated circuit, an integrated optical circuit, a computer, a server, a router, a bridge, a gateway, a modem, a firewall, a switch, a network interface card, a hub, and/or any type of device capable of processing and/or transferring optical traffic. In some implementations, NEs 70 may include OADMs and/or ROADMs capable being configured to add, drop, multiplex, and demultiplex optical signals. NEs 70 may process and transmit optical signals to other NEs 70 throughout optical network 60 in order to deliver optical transmissions.

Optical nodes and elements are further described in U.S. Pat. No. 7,995,921 titled "Banded Semiconductor Optical Amplifiers and Waveblockers" and U.S. Pat. No. 7,394,953 titled "Configurable Integrated Optical Combiners and Decombiners", which are incorporated herein by reference in their entirety.

Configuration Manager 50 may provide information associated with the network configuration changes to another device, such as user device 80, so that a user may interact with the Configuration Manager 50 and/or network 60. User device 80 may include one or more devices that gather, process, search, store, and/or provide information in a manner described herein. In some implementations, user device 80 may include a computer (e.g., a desktop computer, a laptop computer, a tablet computer, etc.), a radiotelephone, a personal communications system ("PCS") terminal (e.g., that may combine a cellular telephone with data processing and data communications capabilities), a personal digital assistant ("PDA") (e.g., that may include a radiotelephone, a pager, Internet/intranet access, etc.), a smart phone, and/or any other type of computation and/or communication device. User device 80 may provide information to and/or receive information from other devices, such as Configuration Manager 50. For example, user device 80 may receive network configuration information from Configuration Manager 50, and may send information associated with network configuration changes to Configuration Manager 50.

Network 60 may include any type of network that includes the use of light as a transmission medium. For example, network 60 may include a fiber-optic based network, an optical transport network, a light-emitting diode network, a laser diode network, an infrared network, and/or a combination of these or other types of optical networks. Network 60 may include Layer 2/Layer 3 NEs, for example, routers. Network 60 may include integrated ROADM and OTN NEs 70, providing L1 and L0 functionality. Network 60 may include communication links 62 between NEs 70 and/or the Configuration Manager 50. For the sake of clarity, Layer 2/Layer 3 NEs such as NEs 70-1, 70-5, 70-6 and the communication links between the Configuration Manager 50 and NEs 70 may not be shown in all of the figures. Network Elements and network functionality are further described in the International Telecommunication Union recommendations, including ITU-T G.709, ITU-T G.872, and ITU-T G.805, which are well known in the art.

Figure 3:
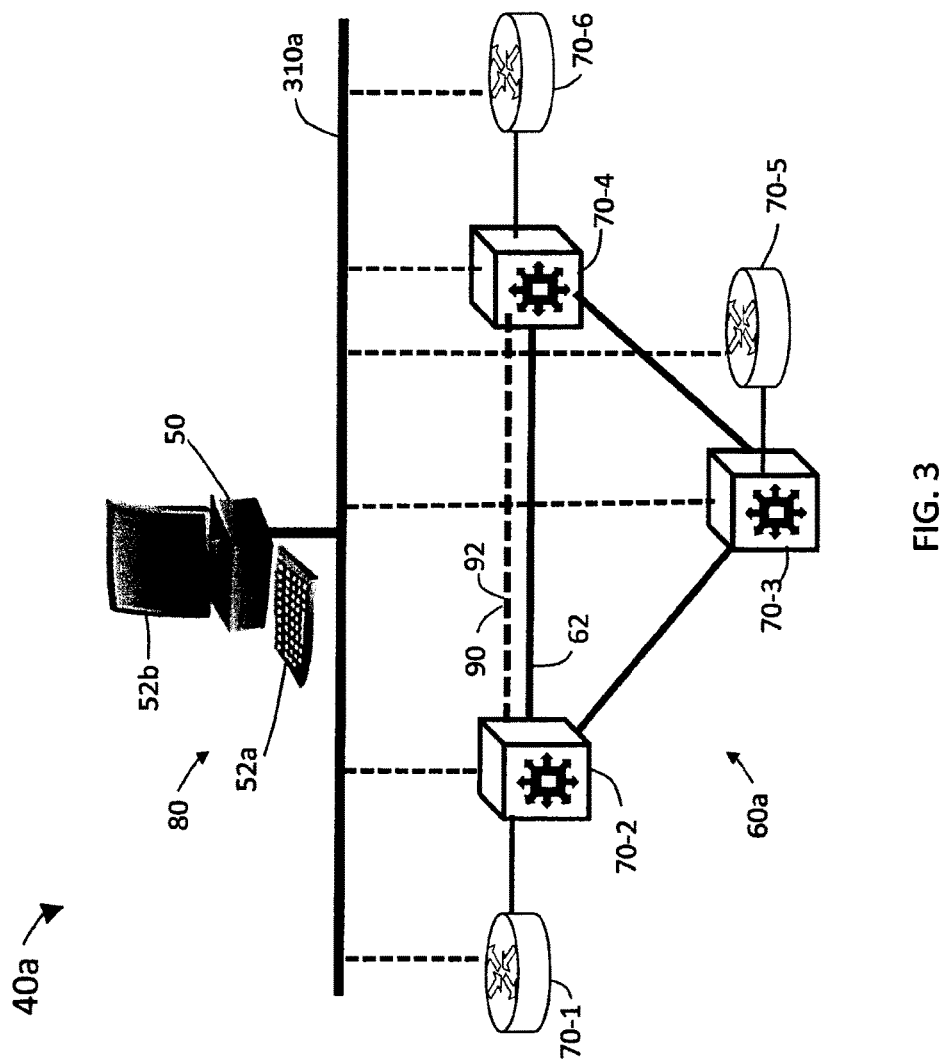
FIG. 3 is a diagram of another exemplary environment in which systems and/or methods described herein may be implemented.

FIG. 3 is a diagram of another exemplary environment 40a in which systems and/or methods described herein may be implemented. In environment 40a, Configuration Manager 50 may be in the form of a computer device having a user device 80, such as a computer with a keyboard 52a and a display 52b. The user device 80 may allow for the input or output of data. However, the Configuration Manager 50 may be implemented with different user interfaces and/or devices as explained. The Configuration Manager may have a bus bar control mechanism 310a. The bus bar control mechanism 310a may be connected physically and/or logically to the NEs 70 in multiple layers of the network 60a. The bus bar control mechanism 310a may be used to control and/or configure/reconfigure NEs 70 in multiple layers of the network 60. In one embodiment, Configuration Manager 50 may be in the form of a Software-Defined Networking (SDN) Controller.

The environment 40a includes network 60a. Network 60a may include any number of NEs 70, though for the sake of clarity only NEs 70-1 through 70-5 are shown. Network 60a includes Layer 2, Layer 3 NEs, such as NEs 70-1, 70-5, 70-6, which are routers in this example. Network 60 may include integrated ROADM and OTN NEs 70, providing L1 and L0 functionality, such as NEs 70-2, 70-3, 70-4. Network 60a may include communication links 62 between NEs 70 and the Configuration Manager 50.

Figure 4:
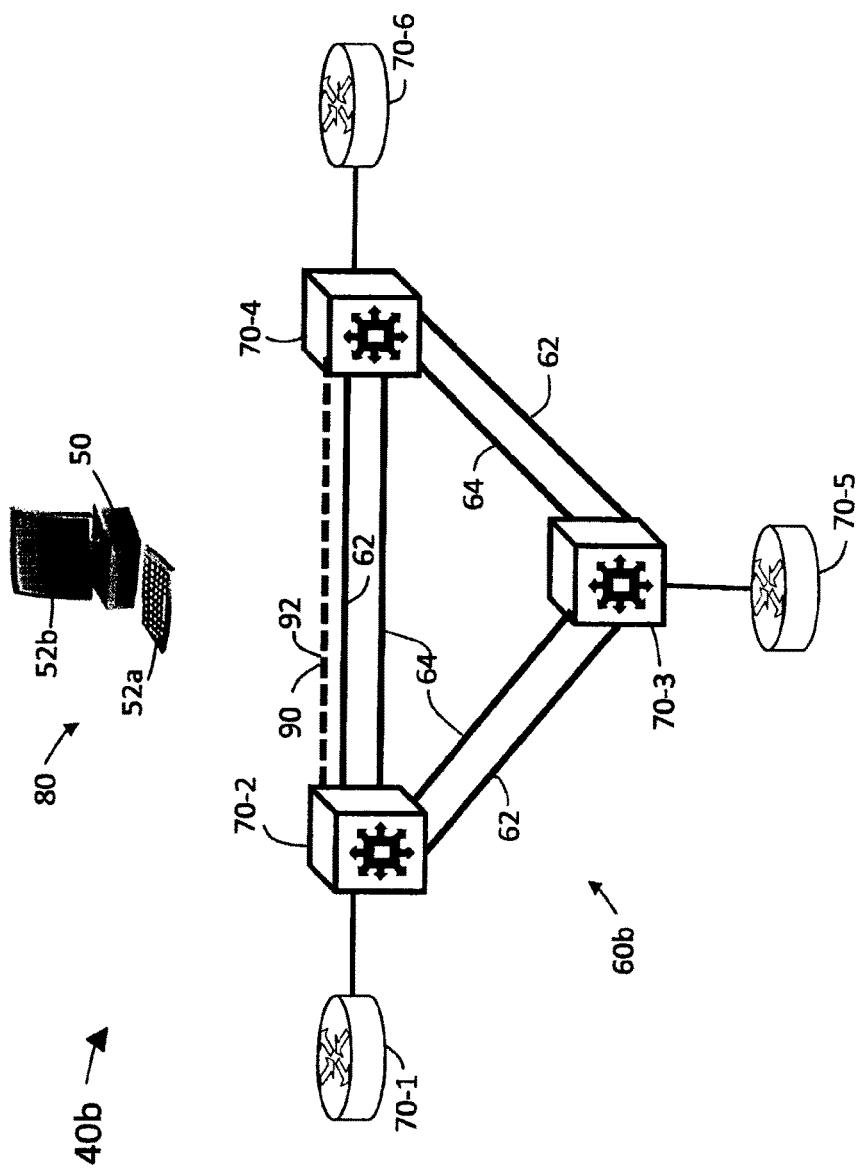
FIG. 4 is a diagram of an exemplary environment similar to that of FIG. 3.

FIG. 4 is a diagram of an exemplary environment 40b similar to environment 40a of FIG. 3, but where the communication between the Configuration Manager 50 and the NEs 70 is not shown for the sake of clarity. In the network 60b, the NEs 70 are connected by working communication links 62 and by spare communication links 64. The working communication links 62 typically carry data traffic when there are no failures in the network 60b. The spare communication links 64 may carry data traffic when there is one or more failure in the network 60b.

In the example illustrated in FIG. 4, the NEs 70 include integrated Optical Transport Network/Dense Wavelength-Division Multiplexing (OTN/DWDM) network elements, NE 70-2, 70-3, and 70-4, which may provide Layer 1 and Layer 0 functionality. The NEs 70 also include Layer 2/Layer 3 network elements, NE 70-1, 70-5, 70-6, such as routers.

The Configuration Manager 50 and/or NEs 70 may configure one or more optical channels, such as one or more super-channels 90, to carry data through the network 60b over the NEs 70, working communication links 62, and/or spare communication links 64.

A super-channel 90, as used herein, may refer to multiple optical carriers 92 that are simultaneously transported over the same optical waveguide (e.g., a single mode optical fiber). Each optical carrier 92 included in a super-channel 90 may be associated with a particular optical wavelength (or set of optical wavelengths). The multiple optical carriers 92 may be combined to create a super-channel 90 using wavelength division multiplexing. For example, the multiple optical carriers 92 may be combined using dense wavelength division multiplexing, in which carrier-to-carrier spacing may be less than one nanometer. In some implementations, each optical carrier 92 may be modulated to carry an optical signal.

Figure 5:
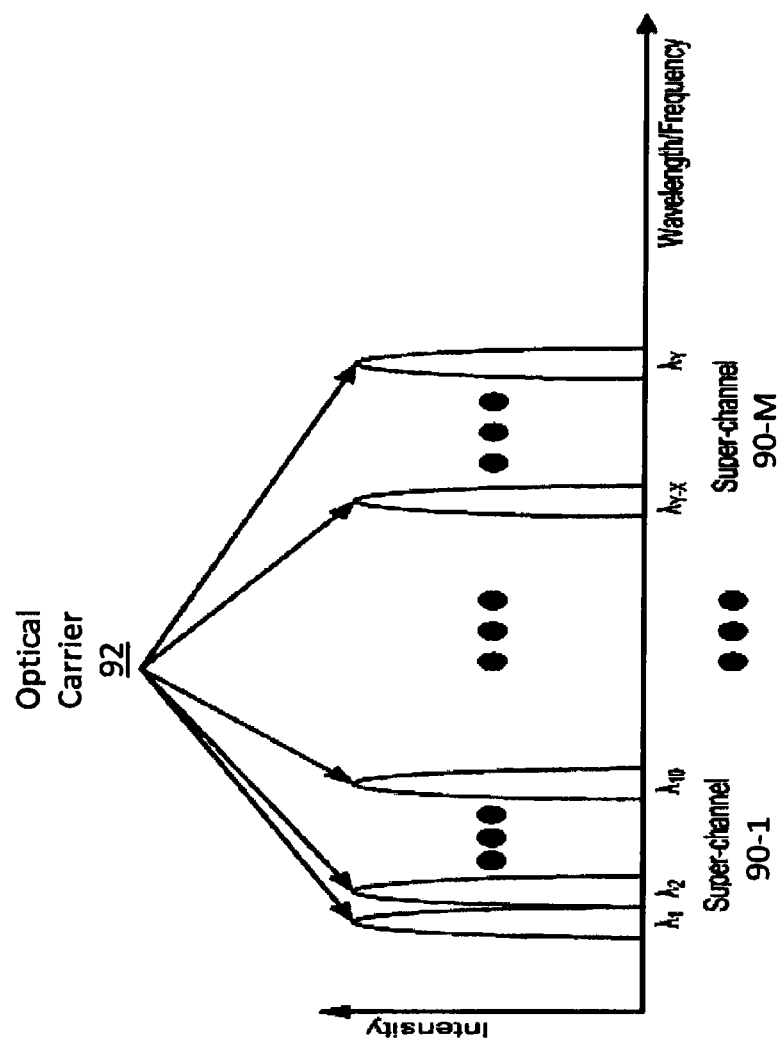
FIG. 5 is an example frequency and/or wavelength spectrum associated with super-channels.

An example frequency and/or wavelength spectrum associated with super-channels 90 is illustrated in FIG. 5. In some implementations, the frequency and/or wavelength spectrum may be associated with a particular optical spectrum (e.g., C Band, C+ Band, etc.). As illustrated, super-channel 90-1 may include multiple optical carriers 92, each of which corresponds to a wavelength λ (e.g., λ1, λ2, through λ10) within a first wavelength band. Similarly, super-channel 90-M may include multiple optical carriers 92, each of which corresponds to a wavelength A (e.g., λY-X through λY) within a second wavelength band. The quantity of illustrated optical carriers 92 per super-channel 90 is provided for explanatory purposes. In practice, super-channel 90 may include any quantity of optical carriers 92.

Optical carrier 92 may be associated with a particular frequency and/or wavelength of light. In some implementations, optical carrier 92 may be associated with a frequency and/or wavelength at which the intensity of light carried by optical carrier 92 is strongest (e.g., a peak intensity, illustrated by the peaks on each optical carrier 92). In some implementations, optical carrier 92 may be associated with a set of frequencies and/or a set of wavelengths centered at a central frequency and/or wavelength. The intensity of light at the frequencies and/or wavelengths around the central frequency and/or wavelength may be weaker than the intensity of light at the central frequency and/or wavelength, as illustrated.

In some implementations, the spacing between adjacent wavelengths (e.g., λ1 and λ2) may be equal to or substantially equal to a bandwidth (or bit rate) associated with a data stream carried by optical carrier 92. For example, assume each optical carrier 92 included in super-channel 90-1 (e.g., λ1 through λ10) is associated with a 50 Gigabit per second ("Gbps") data stream. In this example, super-channel 90-1 may have a collective data rate of 500 Gbps (e.g., 50 Gbps×10). In some implementations, the collective data rate of super-channel 90 may be greater than or equal to 100 Gbps. Additionally, or alternatively, the spacing between adjacent wavelengths may be non-uniform, and may vary within a particular super-channel band (e.g., super-channel 90-1). In some implementations, optical carriers 92 included in super-channel 90 may be non-adjacent (e.g., may be associated with non-adjacent wavelengths in an optical spectrum).

Returning to FIGS. 3 and 4, each super-channel 90 may be provisioned in optical network 60a, 60b as one optical channel and/or as an individual optical channel. Provisioning of an optical channel may include designating an optical route and/or path for the optical channel through optical network 60a, 60b. For example, an optical channel may be provisioned to be transmitted via a set of NEs 70. In some implementations, NEs 70 may be configured as a ring or a mesh. Additionally, or alternatively, NEs 70 may be configured in a point-to-point configuration. Provisioning may be referred to as "allocating" and/or "allocation" herein. Even though each super-channel 90 is a composite of multiple optical carriers 92, the optical carriers 92 included in super-channel 90 may be routed together through optical network 60a, 60b. Additionally, or alternatively, super-channel 90 may be managed and/or controlled in optical network 60a, 60b as though the super-channel 90 included one optical channel and/or one optical carrier 92 at one wavelength. The Configuration Manager 50 may provision the super-channel 90 through the network 60.

Figure 6:
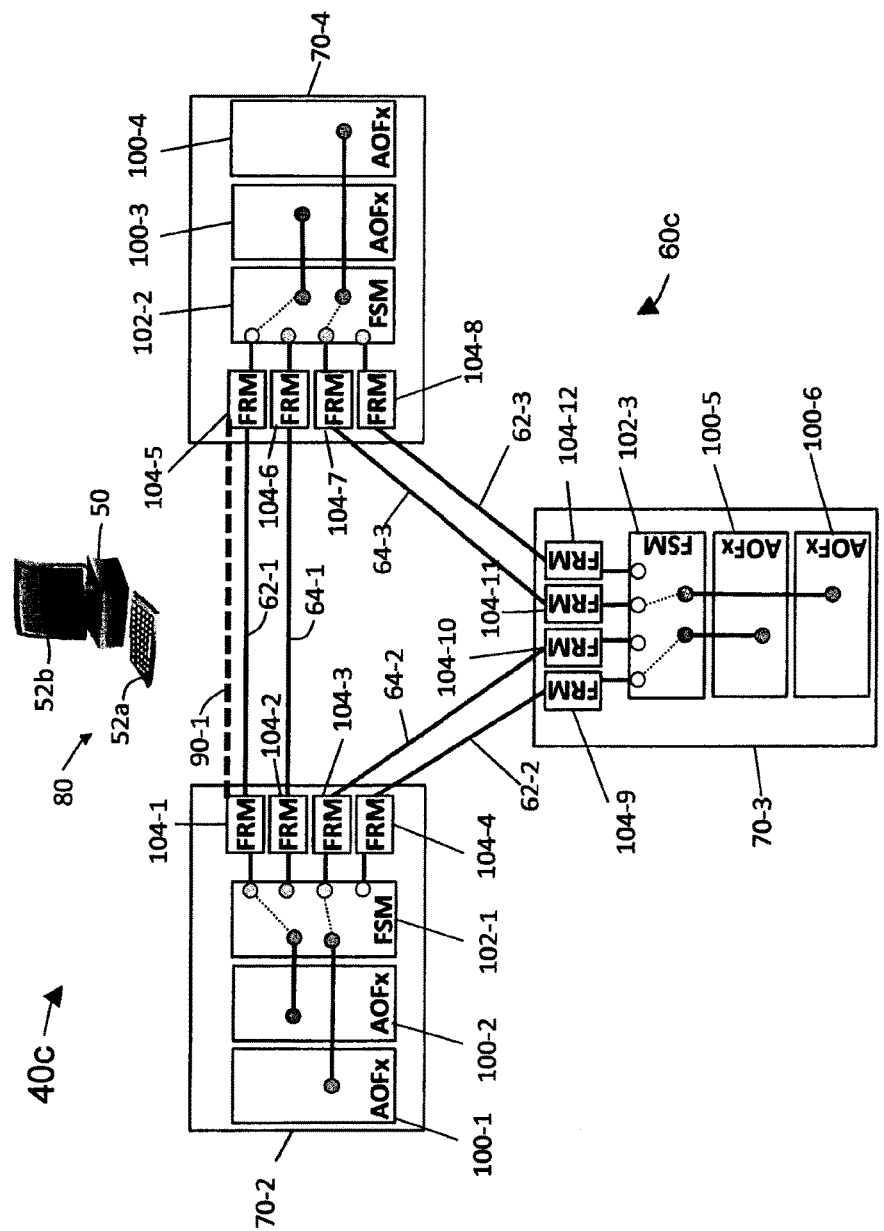
FIG. 6 is a schematic diagram of an exemplary environment, similar to environments of FIGS. 3 and 4.

FIG. 6 is a schematic diagram of an exemplary environment 40c, similar to environments 40a and 40b of FIGS. 3 and 4. In environment 40c, Configuration Manger 50 may control NEs 70 in network 60c. For explanatory purposes, network 60c is shown as comprising three NEs 70-2, 70-3, and 70-4 connected by working communication links 62-1, 62-2, and 62-3, as well as spare communication links 64-1, 64-2, 64-3, forming a full mesh network.

The NEs 70-2, 70-3, and 70-4 may contain one or more digital Line Module (LM) 100 and one or more optical line module 101. The digital Line Modules 100 may be Advanced Optical FlexChannel (AOFx) Line Modules, for example. The optical line modules 101 may have "Colorless, Directionless, and Contentionless" (CDC) functionality, and may be one or more Flexible grid Switch Module (FSM) 102 and one or more optical DWDM module, such as one or more Flexible ROADM Module (FRM) 104. The FSMs 102 and FRMs 104 are considered part of the optical layer of the NEs 70 and the network 60c, and may be nonexclusively referred to herein as optical line modules 101 or optical components. The NEs 70 may have any number of optical line modules 101, such as FSM 102 and FRM 104. In general, the NE 70 may have a FRM 104 for each optical working communication link 62 and for each optical spare communication link 64 utilized by the NE 70. The FSM 102 may be used to set and direct a particular data stream through a particular FRM 104 and thereby to a particular working communication link 62 or spare communication link 64 through the network 60c.

Of course, it will be understood that NEs 70 may have at least one input port and at least one output port, for example, to receive and transmit data. Additionally, the components of the NEs 70 may contain one or more processors (not shown).

In the exemplary network 60c shown in FIG. 6, NE 70-2 includes two Digital Line Modules 100-1, 100-2, one FSM 102-1, and four FRM 104-1, 104-2, 104-3, 104-4. The Digital Line Modules 100-1, 100-2 may transmit data signals to the FSM 102. The FSM 102 may set and/or switch the data signals to particular FRMs 104 to transmit modulated optical data signals, such as super-channels 90 across communication links 62, 64. Circuitry in the NE 70-2, such as circuitry in the FSM 102, may receive and execute instructions from Configuration Manager 50 in order to provision the required optical cross connect between the FSM 102 Add-Drop port and FRM 104 Line Port/Degree Port.

During the operation of optical cross connect creation, the circuitry in the FSM 102 will reconfigure the optical switch and the circuitry in FRM 104 will reconfigure the WSS (wavelength selective switch) to carry the optical signal in the required direction as specified in the instruction from the Configuration Manger 50. In other words, the instruction from the Configuration Manger 50 will contain the ports on the FSM 102 and the FRM 104 that need to be connected to select one of the communication links 62, 64.

NE 70-4 may have a similar construction and operation. In network 60c, NE 70-4 includes two Digital Line Modules 100-3, 100-4, one FSM 102-2, and four FRM 104-5, 104-6, 104-7, and 104-8. Likewise, NE 70-3 may have a similar construction and operation. NE 70-3 includes two Digital Line Modules 100-5, 100-6, one FSM 102-3, and four FRM 104-9, 104-10, 104-11, and 104-12.

Initially, Configuration Manager 50 may transmit signals to NEs 70-2 and 70-4 with instructions to configure a working path for data transmissions through the network 60c. Upon receiving the instructions, digital Line Module 100-2 in NE 70-2 may transmit data signals to FSM 102-1 which connects to FRM 104-1 to modulate optical carriers and transmit super-channel 90-1 through working communication link 62-1 to FRM 104-5 in NE 70-4, connecting to FSM 102-2 and to digital Line Module 100-3.

In the event of one or more failure in the network 60c, for example, failure of working communication link 62-1 and/or FRMs 104-1, 104-5, one or more of the NEs 70-2, 70-4 may send a signal to the Configuration Manager 50 containing information about the failure(s). NEs 70-2, 70-4 may also send one or more signal to the Configuration Manager 50 containing information about whether data transmissions were affected by the failure and/or about other network status information. The Configuration Manager 50 may then determine an alternate path through the network 60c for data transmission affected by the failures for recovery of the data transmission. Configuration Manager 50 may access one or more database of information, or be provided with information, regarding bandwidth availability on communication links 62, 64 in the network 60c.

Configuration Manager 50 may transmit one or more signal to the NE 70-2 containing instructions for the FSM 102-1 to switch data transmissions to an available FRM 104, such as FRM 104-2, connected to a viable communication link, such as spare communication link 64-1. Configuration Manager 50 may also transmit one or more signal to the NE 70-4 containing instructions for the FSM 102-2 to select data transmissions from an available FRM 104, such as FRM 104-6, connected to the chosen spare communication link 64-1.

Additionally, Configuration Manager 50 may automatically re-configure the modulation formats of the digital line modules 100. For example, the original path over working communication link 62-1 may have used Quadruple Phase Shift Keying (QPSK) modulation, which is a type of modulation format for use with small distances between NEs 70. When the super-channel 90-1 is routed along the alternative path, such as spare communication link 64-1, if the alternative path has a long reach (a long distance between NEs 70), then a different modulation format may be needed. In such a case, Configuration Manager 50 may automatically re-configure the optical line modules 101 to an appropriate modulation format, for example, Binary Phase Shift Keying (BPSK). BPSK is a type of modulation format for use with long distances between NEs. Configuration Manager 50 may configure the optical line modules 101 transparently such that user intervention is not required.

Figure 7A:
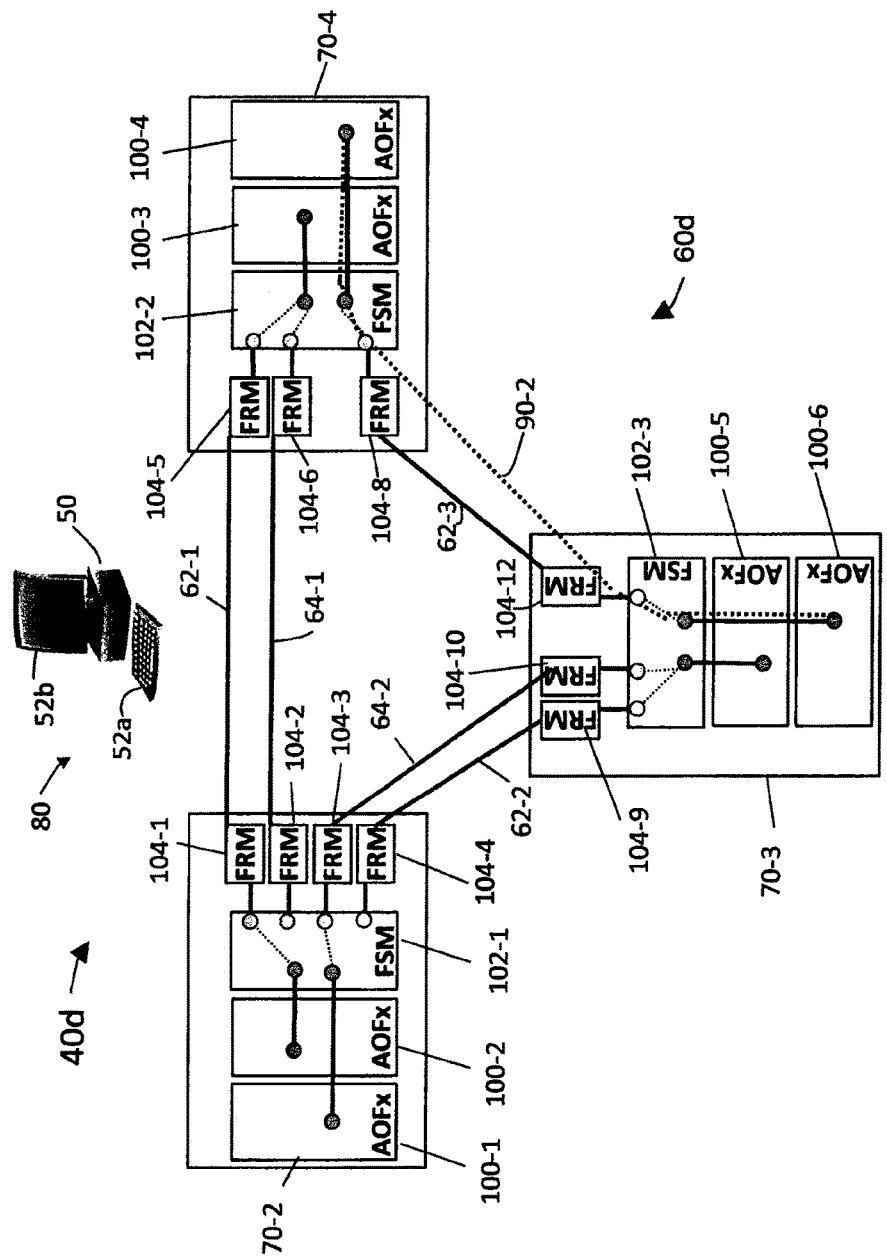
FIG. 7A is a schematic diagram of another exemplary environment in which systems and/or methods described herein may be implemented.

FIG. 7A is a schematic diagram of an exemplary environment 40d containing Configuration Manager 50 and a network 60d. Network 60d is similar to network 60c of FIG. 6, however, network 60c is considered a full mesh network, having a spare communication link 64 for each working communication link 62. Network 60d, in contrast, does not have a spare communication link 64 for each working communication link 62, and may be referred to as an optimized network. For example, Network 60d includes three NEs 70-2, 70-3, and 70-4 connected by working communication links 62-1, 62-2, and 62-3, but only two spare communication links 64-1 and 64-2. Correspondingly, NEs 70-3 and 70-4 include three FRMs 104 each, rather than four. Specifically in this example, NE 70-3 includes FRM 104-9, 104-10, and 104-12, while NE 70-4 includes FRM 104-5, 104-6, and 104-8. In this example, NE 70-2 still contains four FRMs 104-1, 104-2, 104-3, and 104-4. The other components of the NEs 70-2, 70-3, 70-4 remain the same as that already described.

Initially, Configuration Manager 50 may transmit signals to NEs 70-3 and 70-4 with instructions to configure a working path for data transmissions through the network 60*d*. Upon receiving the instructions, digital Line Module 100-4 in NE 70-4 may transmit data signals to FSM 102-2 which connects to FRM 104-8 to modulate optical carriers and transmit super-channel 90-2 through working communication link 62-3 to FRM 104-12 in NE 70-3, connecting to FSM 102-3 and to digital Line Module 100-5.

Figure 7B:
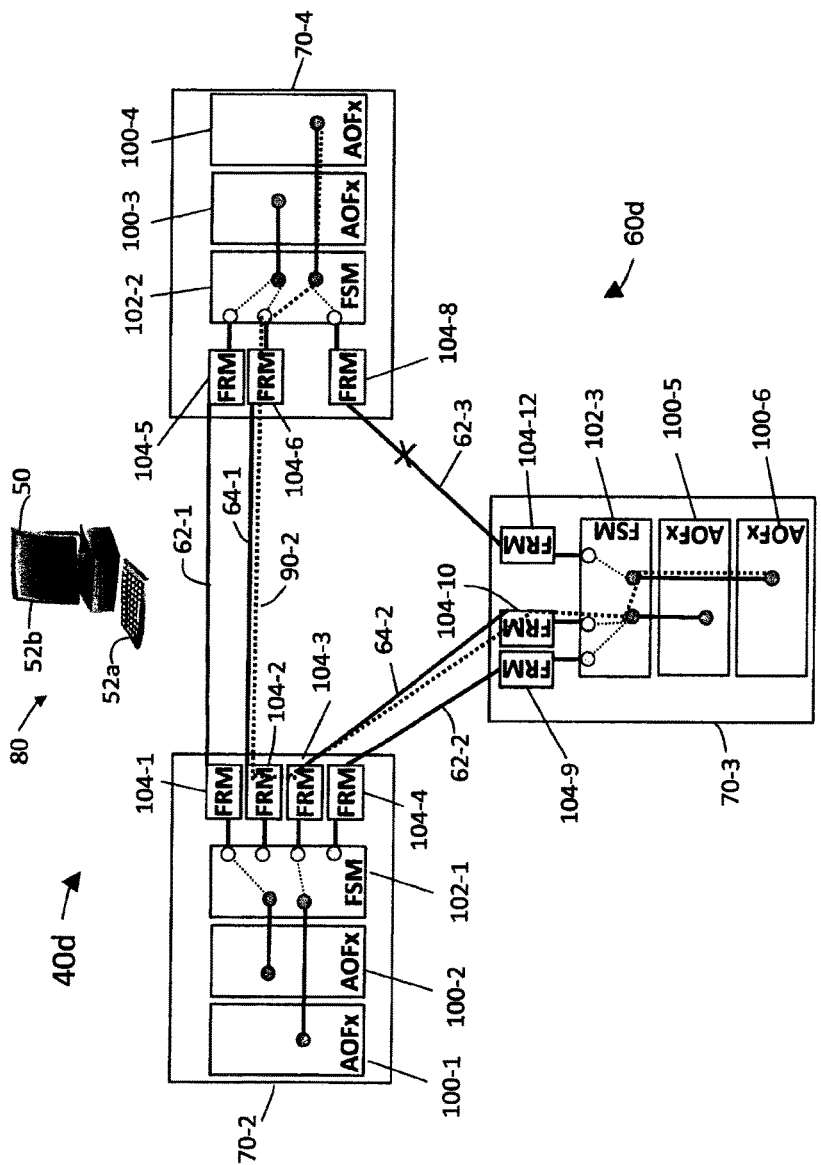
FIG. 7B is a schematic diagram of the exemplary environment of FIG. 7A illustrating a failure scenario.

FIG. 7B is a schematic diagram of the exemplary environment 40*d* of FIG. 7A illustrating a failure scenario. In FIG. 7B, a failure has occurred in the network 60*d* to transmit the super-channel 90-2. For example, working communication link 62-3 and/or FRMs 104-8, 104-12 may fail to transmit super-channel 90-2 through the network 60*d*. One or more of the NEs, for example, NEs 70-3, 70-4, may send a signal to the Configuration Manager 50 containing information about the failure(s). NEs 70-3, 70-4 may also send one or more signal to the Configuration Manager 50 containing information about whether data transmissions were affected by the failure and/or about other network status information. The Configuration Manager 50 may then determine an alternate path through the network 60*d* for data transmission affected by the failures for recovery of the data transmission. Configuration Manager 50 may access one or more database of information, or be provided with information, regarding bandwidth availability on communication links 62, 64 in the network 60*d*.

Configuration Manager 50 may transmit one or more signal to the NEs 70-2, 70-3, 70-4 containing instructions for the FSMs 102-1, 102-2, 102-3 to switch data transmissions to and select data transmissions from available FRMs 104 connected to viable communication links 62, 64. In this example, Configuration Manager 50 configures FSM 102-2 in NE 70-4 (with one or more signals containing instructions) to switch the data transmission of super-channel 90-2 through FRM 104-6 and spare communication link 64-1 to FRM 104-2 in NE 70-2. Configuration Manager 50 configures NE 70-2 (with one or more signals containing instructions) to select the data transmission through FRM 104-2 and switch through FRM 104-3 and spare communication link 64-2. Configuration Manager 50 configures NE 70-3 ((with one or more signals containing instructions)) for the FSM 102-2 to select data transmissions from FRM 104-10. The super-channel 90-2 may then be re-routed along the alternate path through spare communication links 64-1 and 64-2.

Additionally, Configuration Manager 50 may automatically re-configure the modulation formats of the digital line modules 100. For example, the original path over working communication link 62-3 may have used Quadruple Phase Shift Keying (QPSK) modulation, which is a type of modulation format for use with small distances between NEs 70. When the super-channel 90-2 is routed along the alternative path, such as spare communication link 64-1 and 64-2, if the alternative path has a long reach (a long distance between NEs), then a different modulation format may be needed. In such a case, Configuration Manager 50 may automatically re-configure the optical line modules 101 to an appropriate modulation format, for example, Binary Phase Shift Keying (BPSK). BPSK is a type of modulation format for use with long distances between NEs. Configuration Manager 50 may configure the optical line modules 101 transparently such that an outside user is unaware of the re-configuration.

Figure 8A:
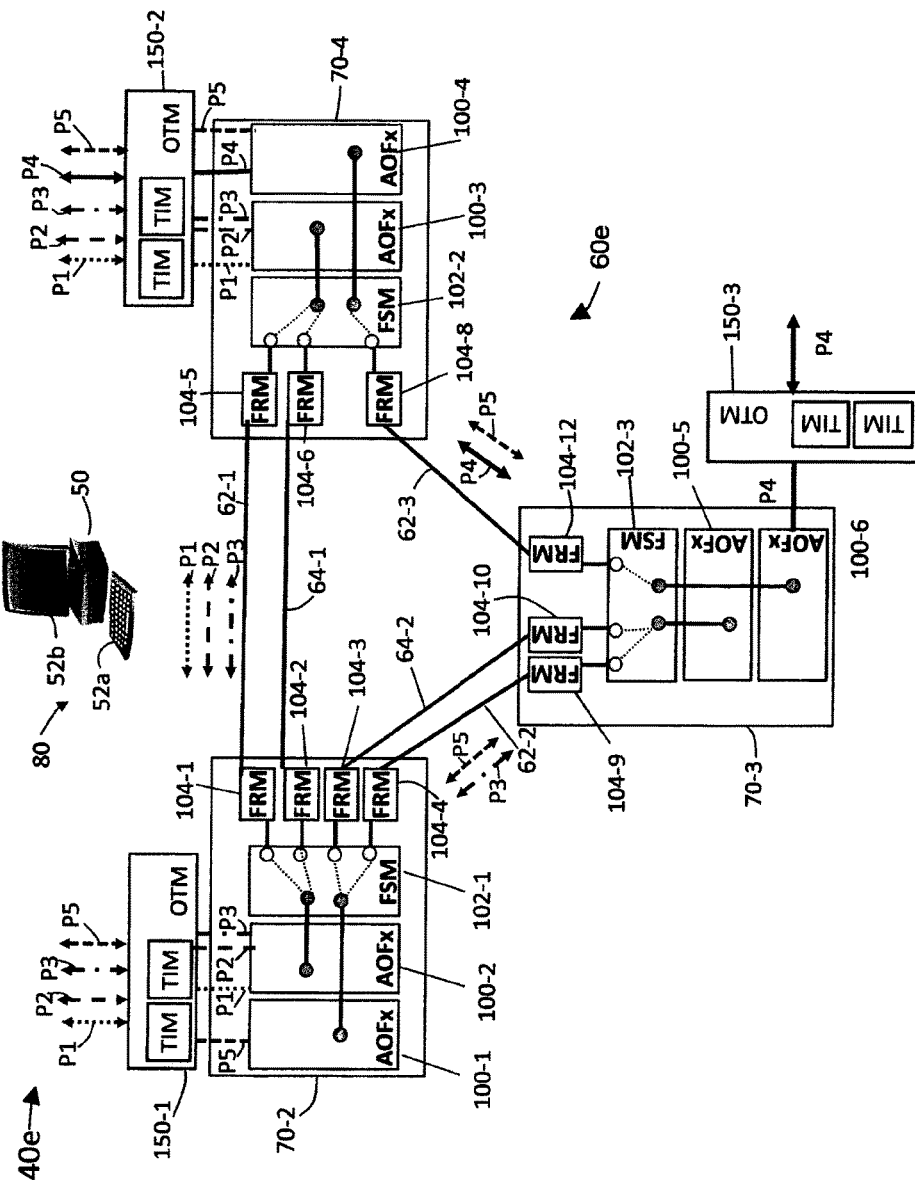
FIG. 8A is a schematic diagram of another exemplary environment 40*d* in which systems and/or methods described herein may be implemented.

FIG. 8A is a schematic diagram of another exemplary environment 40*e* in which systems and/or methods described herein may be implemented. Environment 40*e* is similar to environment 40*d*, however environment 40*d* includes network 60*e*. Network 60*e* is an exemplary integrated Optical Transport Network (OTN) which includes digital circuit tributary interface modules 150-1, 150-2, and 150-3. The digital circuit tributary interface module 150 may be internal or external to the NEs 70-2, 70-3, and/or 70-4. For the sake of simplicity, the remainder of the network 60*e* corresponds to that described for network 60*d* in conjunction with FIGS. 7A and 7B.

OTN paths may be configured through the network 60*e*. In this example, five OTN paths, P1, P2, P3, P4, and P5, are shown for exemplary purposes. Initially, Configuration Manager 50 may configure the network 60*e* such that the OTN paths P1, P2, P3, P4, and P5 have the following configurations:

P1, P2, P3: Digital circuit tributary interface module 150-1 at NE 70-2, digital Line Module 100-2, FSM 102-1, FRM 104-1, working communication link 62-1, at NE 70-4 FRM 104-5, FSM 102-2, digital Line Module 100-3, Digital Circuit tributary interface module 150-2.

P4: Digital circuit tributary interface module 150-3 at NE 70-3, digital Line Module 100-6, FSM 102-3, FRM 104-12, working communication link 62-3, at NE 70-4 FRM 104-8, FSM 102-2, digital Line Module 100-4, Digital Circuit tributary interface module 150-2.

P5: Digital circuit tributary interface module 150-1 at NE 70-2, digital Line Module 100-1, FSM 102-1, FRM 104-4, working communication link 62-2, FRM 104-9 at NE 70-3, FSM 102-3, FRM 104-12, working communication link 62-3, at NE 70-4 FRM 104-8, FSM 102-2, digital Line Module 100-4, Digital Circuit tributary interface module 150-2.

In this example, OTN paths P1, P2, P3, and P4 are restorable paths while P5 is non-restorable.

Figure 8B:
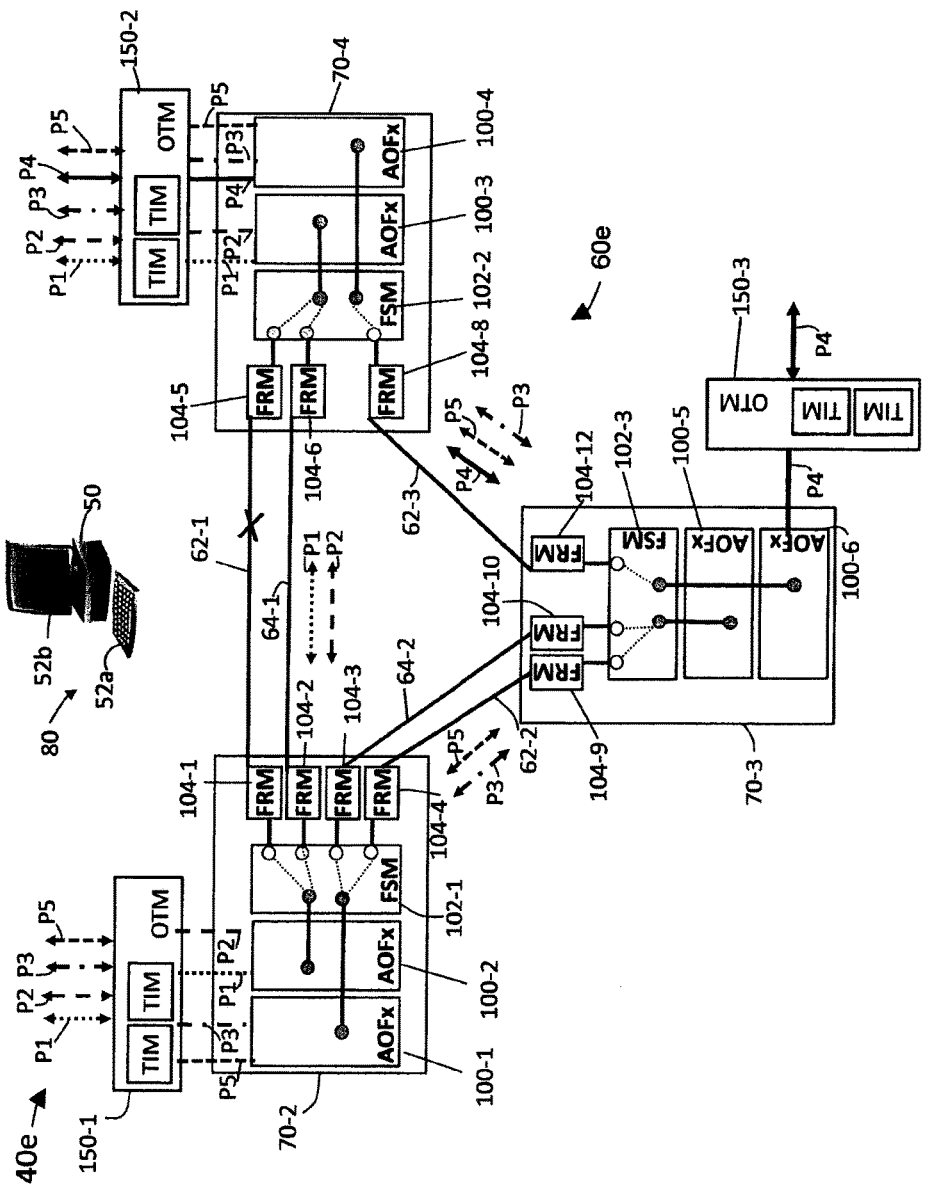
FIG. 8B is a schematic diagram of the exemplary environment of FIG. 8A illustrating a failure scenario.

FIG. 8B is a schematic diagram of the exemplary environment 40*e* of FIG. 8A in which a failure (indicated with an "X" in the figure) has occurred on communication link 62-1. In the event of a failure in the network 60*e*, such as working communication link 62-1, which results in loss of transmission of data, such as P1, P2, and P3, one or more of the NEs 70-2, 70-4, may send a signal to the Configuration Manager 50 containing information about the failure. One or more of the NEs 70-2, 70-4 may also send one or more signal to the Configuration Manager 50 containing information about whether data transmissions were affected by the failure and/or about other network status information. The Configuration Manager 50 may then determine an alternate path through the network 60*e* for data transmission affected by the failures for recovery of the data transmission. Configuration Manager 50 may access one or more database of information, or be provided with information, regarding bandwidth availability on communication links 62, 64 in the network 60*e*.

Configuration Manager 50 may transmit one or more signals to the NEs 70-2, 70-3, 70-4 containing instructions to configure the NEs 70-2, 70-3, 70-4 for the FSMs 102-1, 102-2, 102-3 to switch data transmissions to and select data transmissions from available FRMs 104 connected to viable communication links 62, 64. In this example, Configuration Manager 50 may configure the network 60e such that the OTN paths P1, P2, P3, P4, and P5 have the following configurations:

P1, P2: Digital circuit tributary interface module 150-1 at NE 70-2, digital Line Module 100-2, FSM 102-1, FRM 104-2, spare communication link 64-1, FRM 104-6 at NE 70-4, FSM 102-2, digital Line Module 100-3, Digital Circuit tributary interface module 150-2.

P3, P5: Digital circuit tributary interface module 150-1 at NE 70-2, digital Line Module 100-1, FSM 102-1, FRM 104-4, working communication link 62-2, FRM 104-9 at NE 70-3, FSM 102-3, FRM 104-12, working communication link 62-3, FRM 104-8 at NE 70-4, FSM 102-2, digital Line Module 100-4, Digital Circuit tributary interface module 150-2.

P4: (same as in FIG. 8A) Digital circuit tributary interface module 150-3 at NE 70-3, digital Line Module 100-6, FSM 102-3, FRM 104-12, working communication link 62-3, FRM 104-8 at NE 70-4, FSM 102-2, digital Line Module 100-4, Digital Circuit tributary interface module 150-2.

Figure 8C:
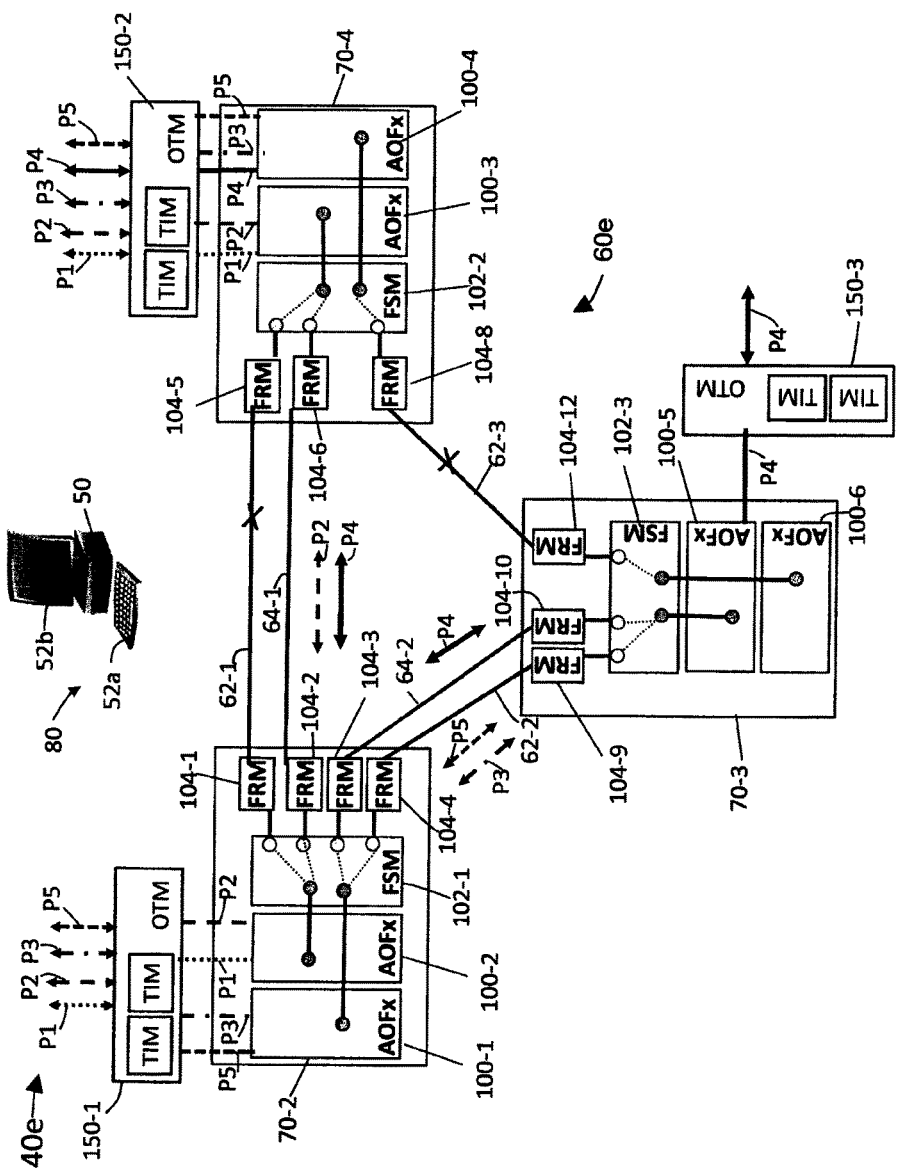
FIG. 8C is a schematic diagram of the exemplary environment of FIG. 8A illustrating another failure scenario.

FIG. 8C is a schematic diagram of the exemplary environment 40e of FIG. 8A in which multiple failures have occurred. In this example, both communication links 62-1 and 62-3 have failed (indicated with "X"s). Again, one or more of the NEs 70-2, 70-3, 70-4, may send a signal to the Configuration Manager 50 containing information about the failure(s). One or more of the NEs 70-2, 70-3, 70-4 may also send one or more signal to the Configuration Manager 50 containing information about whether data transmissions were affected by the failure and/or about other network status information. The Configuration Manager 50 may then determine an alternate path through the network 60e for data transmission affected by the failures for recovery of the data transmission. Configuration Manager 50 may access one or more database of information, or be provided with information, regarding bandwidth availability on communication links 62, 64 in the network 60e. When Configuration Manager 50 determines that there is insufficient bandwidth to reroute all of the failed transmission streams, Configuration Manager 50 may use OTN path priority to determine a hierarchy of importance for the OTN path data transmissions. In this example, P4 has the highest priority, P2 a lesser priority, and P1, P3, and P5 have an even lesser priority than P2 and P4. In this example, Configuration Manager 50 may configure the network 60e such that the OTN paths P1, P2, P3, P4, and P5 have the following configurations:

P1: Not transmitted through the network.

P2: (same as in FIG. 8B) Digital circuit tributary interface module 150-1 at NE 70-2, digital Line Module 100-2, FSM 102-1, FRM 104-2, spare communication link 64-1, FRM 104-6 at NE 70-4, FSM 102-2, digital Line Module 100-3, Digital Circuit tributary interface module 150-2.

P3, P5: Not transmitted fully through the network, though may be transmitted from NE 70-2 to NE 70-3 on working communication link 62-2, but the subsequent link 62-3 is not available.

P4: Digital circuit tributary interface module 150-3 at NE 70-3, digital Line Module 100-5, FSM 102-3, FRM 104-10, spare communication link 64-2, FRM 104-3 at NE 70-2, FRM 104-2, spare communication link 64-1, FRM 104-6 at NE 70-4, FSM 102-2, digital Line Module 100-4, Digital Circuit tributary interface module 150-2.

Again, Configuration Manager 50 may automatically re-configure the modulation formats of the digital line modules 100 if made necessary by differing distances between NEs 70 in the original path versus the alternate path through the network 60e. For example, the original path over working communication link 62-3 may have used Quadruple Phase Shift Keying (QPSK) modulation, which is a type of modulation format for use with small distances between NEs 70. When the OTN path P4 is routed along the alternative path, such as spare communication link 64-1 and 64-2, if the alternative path has a long reach (a long distance between NEs), then a different modulation format may be needed. In such a case, Configuration Manager 50 may automatically re-configure the optical line modules 101 to an appropriate modulation format, for example, Binary Phase Shift Keying (BPSK). BPSK is a type of modulation format for use with long distances between NEs. Configuration Manager 50 may configure the optical line modules 101 transparently such that an outside user is unaware of the re-configuration.

It will be understood that the limited number and type of NEs 70 and communication links 62, 64 have been shown for the sake of example and that Configuration Manager 50 may configure and control networks 60 with any number and type of components and the concepts described herein may be applied to any number or size of networks 60.

Additionally, unidirectional and bidirectional protection are further described in RFC 4872, "RSVP-TE Extensions for E2E GMPLS Recovery" (May 2007). Further, logical tables in one or more databases (not shown) may be used to support protection path activation logic.

CONCLUSION

Conventionally, protection and recovery mechanisms in transport networks focus on determining and utilizing alternative digital components in the network. In accordance with the present disclosure, methods and systems are described in which orchestration of multi-layer protection utilizing optical components is implemented.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Further, while implementations have been described in the context of an optical network, this need not be the case. These implementations may apply to an electronic network using copper cabling, or even a wireless network. It should be understood that the methods described herein may be applied to any protection or protection scenario for any mesh network.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

REFERENCES

The following references are hereby incorporated herein by reference:

RFC 2328, "OSPF Version 2," Moy, J., The Internet Society, April 1998.

RFC 3209, "RSVP-TE: Extensions to RSVP for LSP Tunnels", The Internet Society, Awduche et al., December 2001.

RFC 3473 "Generalized Multi-Protocol Label Switching (GMPLS) Signaling Resource ReserVation Protocol-Traffic Engineering (RSVP-TE) Extensions," Berger (Ed.), The Internet Society, January 2003.

RFC 3945, Mannie, E., "Generalized Multi-Protocol Label Switching (GMPLS) Architecture", October 2004.

RFC 4379, "Detecting Multi-Protocol Label Switched (MPLS) Data Plane Failures," Kombella, K. and Swallow, G., The Internet Society, February 2006.

RFC 4872, "RSVP-TE Extensions for E2E GMPLS Recovery," J. P. Lang, Y. Rekhter, D. Papadimitriou, The Internet Society, May 2007.

RFC 4873, "GMPLS Segment Recovery," L. Berger et al, The Internet Society, May 2007.

G.709-v3 ITU-T, "Interfaces for the Optical Transport Network (OTN)", G.709 Recommendation, December 2009.

G.805 ITU-T, "Generic functional architecture of transport networks", G.805 Recommendation, March 2000.

G.872 ITU-T, "Architecture of optical transport networks", November 2001.

X.200 ITU-T, "Information technology—Open Systems Interconnection—Basic Reference Model: The basic model", July 1994.

What is claimed is:

1. A computer-readable medium, comprising:
  a non-transitory memory device storing one or more instructions that, when executed by a processor, cause the processor to:
    store, in the non-transitory memory device, multi-layer network information comprising at least one of link availability, bandwidth availability, priority levels for paths in a multi-layer network, path status in the multi-layer network, and status for network elements in the multi-layer network;
    receive, via at least one input component, at least one message from a network element in the multi-layer network comprising information indicative of at least one failure of at least one working path in the network, wherein the working path carries data traffic through the network when there is no failure, the data traffic being carried by a first optical signal;
    determine, with a configuration management device that is remote from the network elements, automatically, based at least in part on the multi-layer network information, an alternate path for transmission of the data traffic through the multi-layer network;
    receive with the configuration management device super-channel allocation information that identifies first super-channels that are available for transmission, second super-channels assigned to transmit optical signals, and third super-channels that are blocked from transmitting optical signals; and
    transmit, from the configuration management device, at least one signal comprising configuration instructions to at least one optical line module, the configuration information including information indicative of reserve capacity over fourth super-channels, the at least one optical line module including a switch module that is part of an optical layer of one of the network elements and receives the configuration instructions, the switch module of the at least one optical line module including a plurality of ports, the configuration instructions including information identifying at least one of the plurality of ports, such that the switch module of the at least one optical module switches the data traffic using the alternate path in response to the configuration instructions, wherein a second optical signal is transmitted over the alternate path in response to the failure, each of the first, second, third, and fourth super-channels includes a respective one of first, second, third, and fourth groups of optical carriers that are simultaneously transported over a common optical waveguide.

2. The computer-readable medium of claim 1, wherein the at least one optical line module further comprises at least one ROADM based optical line module in addition to the switch module.

3. The computer-readable medium of claim 1, wherein the at least one optical line module provides colorless, directionless, and contentionless functionality.

4. The computer-readable medium of claim 1, wherein the first optical signal is included in a super-channel including a plurality of optical carriers, each optical carrier having a corresponding one of a plurality of wavelengths.

5. The computer-readable medium of claim 1, wherein the information indicative of at least one failure of at least one working path is information indicative of at least one failure of at least two working paths, and further causing the one or more processors to:
  determine, automatically, based at least in part on the multi-layer network information, which of the failed working paths has higher priority; and
  transmit, via the at least one output component, at least one signal comprising configuration instructions to at least one network element having integrated digital and optical components, the configuration instructions directing the optical component to switch the data traffic from the higher priority working path to the alternate path.

6. A method comprising:
  transmitting, with circuitry of a first node in a network, to a configuration management device that is remote from the first node, a signal comprising information indicative of at least one failure in at least one working path through a network, a first optical signal being transmitted on the working path prior to the failure;
  receiving, by a switch module that is part of an optical layer of the first node, the switch module having a plurality of ports and being provided in at least one optical line module in the first node, from the configuration management device, a signal comprising instructions for switching at least one data transmission from the at least one working path to an alternate path using the at least one optical line module in the first node, the instructions including information identifying at least one of the plurality of ports, such that the switch module that is part of the optical layer of the first node selects an alternate path in response to the instructions, such that data is switched from the at least one working path to the alternate path, wherein the data is carried by a second optical signal on the alternate path in response to the failure
  receiving with the configuration management device super-channel allocation information that identifies first super-channels that are available for transmission, second super-channels assigned to transmit optical signals, and third super-channels that are blocked from transmitting optical signals, each of the first, second, third, and a fourth of super-channels includes a respective one of first, second, third, and fourth groups of optical carriers that are simultaneously transported over a common optical waveguide; and transmitting, from the configuration management device, reserve capacity information indicative of reserve capacity over fourth super-channels.

7. The method of claim 6, wherein the at least one optical line modules further comprises at least one ROADM in addition to the switch module.

8. The method of claim 6, wherein the at least one optical line module provides colorless, directionless and contentionless functionality.

9. The method of claim 6, wherein the information indicative of at least one failure of at least one working path is information indicative of at least one failure of at least two working paths, and further causing the one or more processors to:

determine, automatically, based at least in part on the multi-layer network information, which of the failed working paths has higher priority; and transmit, via the at least one output component, at least one signal comprising configuration instructions to at least one network element having integrated digital and optical components, the configuration instructions directing the optical component to switch the data traffic from the higher priority working path to the alternate path.

\* \* \* \* \*